US005331856A

United States Patent [19]

Cassidy

[11] Patent Number: 5,331,856

[45] Date of Patent: Jul. 26, 1994

[54] PRESSURE DEVICES

[75] Inventor: Ronald F. Cassidy, Waterlooville, England

[73] Assignee: Pall Corporation, Glen Cove, N.Y.

[21] Appl. No.: 877,193

[22] Filed: May 1, 1992

[30] Foreign Application Priority Data

May 1, 1991 [GB] United Kingdom .............. 9109382.3

[51] Int. Cl.5 ............................ G01L 7/16; G01L 9/10

[52] U.S. Cl. ........................................... 73/745; 73/38; 200/82 E

[58] Field of Search .................... 73/38, 744, 745, 746; 200/82 E, 81 R, 82 R

[56] References Cited

U.S. PATENT DOCUMENTS

| | | | |
|---|---|---|---|
| 3,093,716 | 6/1963 | Horowitz | 200/83 |
| 3,342,959 | 9/1967 | Breunich | 200/83 |
| 3,429,291 | 2/1969 | Hoffman | 73/744 |
| 4,130,745 | 12/1978 | Hetzer | 200/82 E |

FOREIGN PATENT DOCUMENTS

| | | |
|---|---|---|
| 0069813 | 7/1981 | European Pat. Off. . |
| 1551623 | of 1968 | France . |
| 8202498 | 8/1982 | PCT Int'l Appl. . |
| 721848 | 1/1952 | United Kingdom . |
| 1092725 | 11/1965 | United Kingdom . |
| 1185048 | 7/1967 | United Kingdom . |
| 1207866 | of 1968 | United Kingdom . |
| 1231225 | 6/1968 | United Kingdom . |
| 1175009 | 10/1968 | United Kingdom . |
| 1369181 | 2/1973 | United Kingdom . |

*Primary Examiner*—Donald O. Woodiel
*Attorney, Agent, or Firm*—Leydig Voit & Mayer

[57] ABSTRACT

A pressure indication device comprises a housing including a bore in which is received a slidable piston. The piston has two end faces, one of which is for connection to a source of fluid at higher pressure and the other of which is for connection to a source of fluid at lower pressure. The device produces an indication when the pressure differential reaches a predetermined value. In an inoperative position of the piston, a portion of the upstream face co-operates with the bore to provide a face seal which reduces leakage between the bore and the piston and which also reduces the effective area of the upstream face. In addition, a labyrinth seal is provided between the bore and the piston. When the predetermined pressure is reached, the piston moves, and as it does so, the effective area of the upstream face is increased. This causes increasingly rapid movement of the piston so providing a very positive indication that predetermined pressure has been reached and so overcoming any tendency of the piston to stick or move only very gradually as the predetermined pressure is reached.

11 Claims, 1 Drawing Sheet

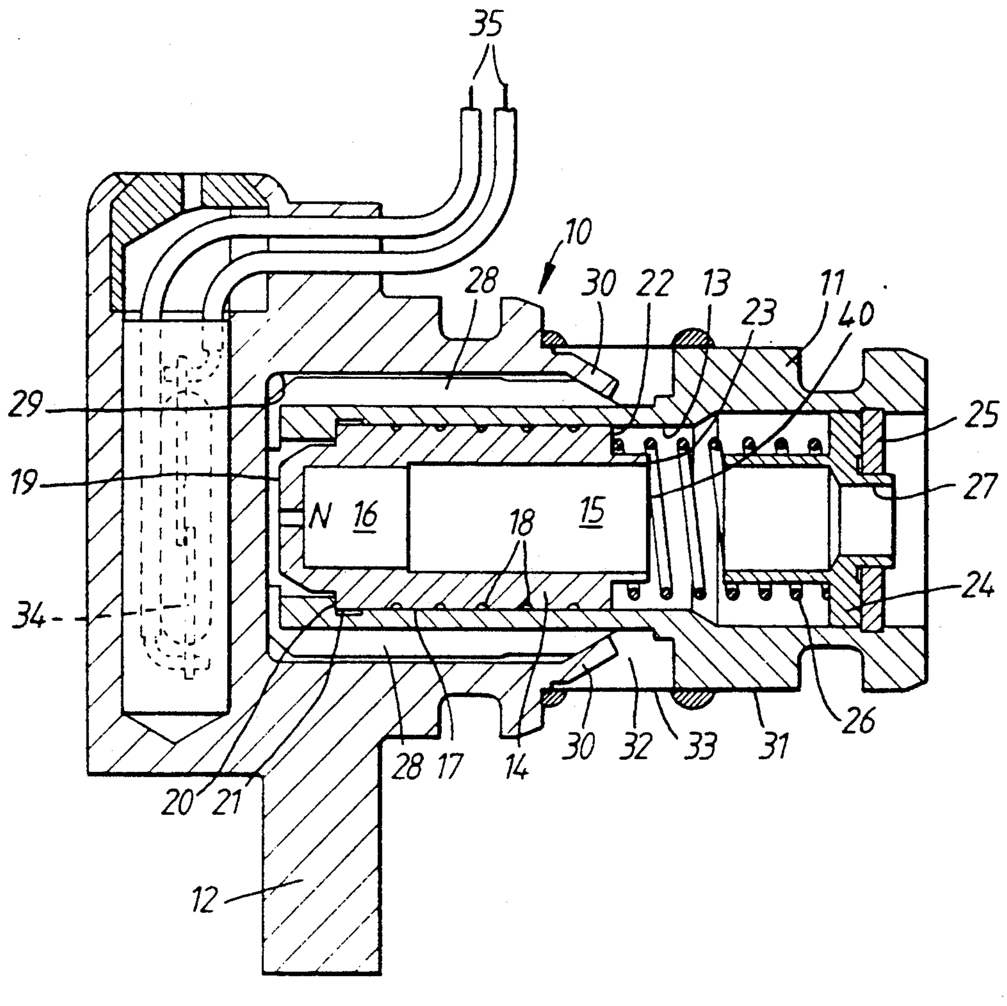
35
10
28
30
22
13
23
11
40
29
25
19
27
N
16
15
18
34
24
20
21
28
17
14
30
32
33
31
26
12

PRESSURE DEVICES

BACKGROUND OF THE INVENTION

1. Field of the Invention

The invention relates to pressure devices such as differential pressure indicators.

Pressure devices which measure differential pressure across a piston frequently use seals to minimize flow of fluid from a higher pressure face of the piston to a lower pressure face of the piston. Such seals apply a force to the piston and any variation in this force causes difficulty in calibrating such devices within required tolerances and will cause the operational parameters of the device to change with time.

2. Review of the Prior Art

Seals currently employed in such devices include piston rings which can be fitted either to the piston or to a bore in which the piston reciprocates, flexible diaphragms and bellows. However, the resistance to movement of the piston caused by these currently employed seals is variable due to inherent manufacturing tolerances, temperature effects, actual pressure levels, lubrication, friction and stiction. Lubrication, friction and stiction effects can vary significantly with time, particularly with repeated temperature fluctuation and especially with elastomeric seal materials.

Where a small leakage is allowable across the piston, the seal can be omitted, being replaced with a close fitting piston within the cylinder perhaps with a labyrinth seal using grooves in the piston and/or the bore. However, even in this proposal, problems can arise in that even a small leakage across the piston can cause problems in the device or fluid system if continuous over a long period of time.

SUMMARY OF THE INVENTION

According to the invention, there is provided a pressure device for indicating when a pressure differential between fluid at higher and lower pressures reaches a predetermined value and comprising a housing including a bore within which a piston is slidable, the piston having upstream and downstream faces to which the higher and lower pressures are applied respectively, the piston moving from an inoperative position when said predetermined value is exceeded, a portion of the upstream face of the piston engaging with the housing, in said inoperative position, to provide a face seal which reduces fluid flow between the bore and the piston and also reduces the effective area of the upstream face, the piston moving at said predetermined value to disengage said portion of the piston from the bore so breaking the face seal and increasing the effective area of the upstream face of the piston.

In this way, the piston moves very positively when the pressure differential has a predetermined value. There is no gradual creeping at the predetermined pressure.

BRIEF DESCRIPTION OF THE DRAWING

The following is a more detailed description of an embodiment of the invention, by way of example, reference being made to the accompanying drawing which is a cross-sectional view of a differential pressure indicator.

DESCRIPTION OF THE PREFERRED EMBODIMENTS

Referring to the drawing, the indicator comprises a housing 10 formed by two parts: a piston housing 11 and a plug housing 12. The piston housing is generally cylindrical in shape with an interior bore 13. A piston 14 is reciprocable in the bore 13 and has a hollow interior 15 in which is mounted a magnet 16, for a purpose to be described below. The exterior surface 17 of the piston is provided with a plurality of axially spaced circumferentially extending grooves 18 which cooperate with the bore 13 to form a labyrinth seal inhibiting fluid flow between the exterior surface 17 of the piston 14 and the bore 13.

The piston has two faces, a first, upstream, face and a second, downstream, face. The upstream face is formed by a closed end surface 19 of the piston 14. This upstream face includes an annular radially outwardly extending surface 20 which, in the position of the piston 14 shown in the drawing, which is an inoperative position, engages with a cooperating radially inwardly extending annular surface 21 provided around the bore 13. This provides a face seal upstream of the labyrinth preventing the passage of fluid between the bore 13 and the piston 14 and also reduces the effective area of the upstream face.

The downstream face is formed by an end surface 40 of the magnet 16 and by two annular radially extending surfaces 22,23 at the end of the piston opposite the upstream face.

The end of the piston housing 11 remote from the magnet 16 holds a retainer 24 which is held in position by a circlip 25. This retainer 24 supports a compressed coil spring 26 which extends between the retainer 24 and one of the end radial surfaces 23 of the piston. Thus this spring 26 urges the piston 14 towards the inoperative position shown in the drawing.

A port 27 is provided in the retainer 24 for a purpose to be described below.

The portion of the exterior surface of the piston housing 11 which overlies the piston 14 is provided with two diametrically opposed grooves 28 with the diameter of the piston housing 11 being substantially equal to the interior diameter of a cavity 29 of circular cross-section in the plug housing 12 so that the housing 11 is a tight fit within this cavity. The ends of the cavity 29 are provided with a cylindrical portion 30 that is deformed by swaging to engage the ribs 28 and so hold the piston housing 11 in the cavity 29 of the plug housing 12.

In this position, an annular exterior flange 30 provided on the piston housing is spaced from the ends of the grooves 29. This forms an annular port 32 for a purpose to be described below. The port 32 is covered with an annular filter mesh 33.

The plug housing 12 carries a reed switch 34 encased in a resin and connected to a pair of electrical leads 35.

The pressure differential switch described above with reference to the drawing is for use in detecting when a pressure difference between a source of fluid at a higher pressure and a source of fluid at a lower pressure exceeds a predetermined value. The sensing of such pressure differences can, for example, be necessary in filters where an increase in the value of a pressure difference between the pressure at an inlet and the pressure at an outlet of a filter can indicate that the filter is becoming clogged and thus requires replacement.

The source of lower pressure fluid is connected to the port 27 formed in the retainer 24. The source of higher pressure fluid is connected to the port 32 formed between the piston housing 11 and the plug housing 12. Thus the higher pressure fluid passes through the grooves 28 to a first end of the bore 13 to act on the upstream face of the piston 14 while the lower pressure fluid passes to a second end of the bore 13 to act on the downstream face of the piston 14. It should be noted that, when the piston is in the inoperative position shown in the drawing, the higher pressure acts only on the reduced area of the upstream face and not on the portion 20 of that face which forms the face seal.

As the pressure differential increases, the net force on the piston increases and tends to move the piston 14 against the force provided by the spring 26. Since the face seal leak rate is substantially lower than that of the labyrinth seal, there is little leakage of fluid between the bore 13 and the piston 14 until such movement commences. At a pressure differential determined by the reduced upstream face area and the spring force, the piston 14 commences sliding in the bore 13. As soon as this sliding movement starts, the effective area of the upstream face of the piston 14 is increased since the higher pressure fluid can now act on the radially outwardly extending annular surface 20 of the piston 14. As a result, there is an abrupt change in the pressure forces acting on the piston 14 resulting in further rapid movement of the piston. This movement continues until equilibrium is established between this force and the spring 26.

This causes movement of the magnet 16 which in turn actuates the reed switch 34 to produce an electrical signal which passes along the electrical leads 35 to an indicator.

Thus, the provision of the face seal reduces significantly leakage when the piston 14 is in the inoperative position. It also has the effect that, as the piston 14 moves away from the inoperative position, the area acted on by the higher pressure is suddenly increased so that the piston 14 moves rapidly to an equilibrium position. This reduces substantially the effect of external factors on the pressure differential at which the device operates. Thus the indication is given more or less instantaneously upon the piston 14 just starting to move. This removes the rate factor from the calculation of the piston position for actuation, which is normally a factor in a piston where the higher pressure is applied over a constant area.

Differential pressure indicators of the kind described above with reference to the drawings have been produced and the repeatability of samples, one to the other, has been proved to be excellent. Also, frequent operation of any particular device has shown insignificant variation, even if left for long periods between actuation. Devices have been tested with a very low differential pressure setting and have been found to be reliable. The fluid leak rate is virtually zero until the device actuates, whereupon leakage is limited by the labyrinth seal. Since the device is normally in the inoperative position, it is virtually leak-free for the vast majority of the period in service.

It will be appreciated that although the device described above with reference to the drawing uses a face seal and a labyrinth seal in series, the second seal need not be a labyrinth seal, it could be some other form of seal or a second seal could be omitted. In addition, although the seal arrangement described above with reference to the drawing has been applied to a differential pressure indicator, it could be applied to an over-pressure or an under-pressure indicator or any flow indicator which uses a sensing piston. In this case, the lower pressure fluid could be ambient air.

In addition, although the device described above with reference to the drawing uses a magnet 16 to actuate a reed switch 34, the indication of the predetermined pressure need not be electrical. It could be a mechanical indication or a visual indication with the movement of the piston being simply observable.

I claim:

1. A device for indicating when a pressure differential between fluid at a higher pressure and a fluid at a lower pressure reaches a predetermined value, comprising:

a housing;

a bore formed within the housing and having first and second ends;

a piston slidable within the bore;

a first port leading to the first end of the bore and for connection to a source of fluid at high pressure;

a first face on the piston, located towards the first end of the bore and having an area acted on by the higher pressure fluid and having a first portion and a second portion surrounded by the first portion;

a second face on the piston, directed oppositely to the first face, located towards the second end of the bore, and having an area acted on by the lower pressure fluid; and a sealing surface provided on the housing and engaging the first portion of the first face, when the piston is in an inoperative position, to form a face seal inhibiting fluid flow between the first and second ends of the bore and to reduce the area of the first face acted on by the higher pressure fluid, the second portion of the first face of the piston projecting past the sealing surface toward the first end of the bore when the piston is in the inoperative position, the piston moving in the bore at the predetermined value to break the face seal and increase the area of the first face acted on by the higher pressure fluid.

2. A device according to claim 1 wherein the piston includes a surface in sliding engagement with the bore, a labyrinth seal being provided between the piston surface and the bore to reduce fluid flow between the piston and the bore after the face seal has been broken.

3. A device according to claim 1 wherein the firs portion of the first face comprises an annular radially extending surface, the sealing surface of the housing comprising a cooperating annular radially extending surface, the two radially extending surfaces together forming the face seal in the inoperative position of the piston.

4. A device according to claim 3 wherein the annular radially extending surface of the piston extends around the periphery of the first face of the piston.

5. A device according to claim 1 including a spring which acts on the piston to urge the piston into the inoperative position, the piston moving from the inoperative position against the spring so that the predetermined value is reached with an increasing pressure differential.

6. A device according to claim 1 wherein an electrical device is provided for producing an electrical signal at the predetermined value.

7. A device according to claim 6 wherein the electrical device comprises a switch actuated by a movement of a magnet carried by the piston when the differential pressure reaches the predetermined value.

8. A device according to claim 7 wherein the magnet extends beyond the sealing surface toward the first end of the bore when the piston is in the inoperative position.

9. A device according to claim 1 wherein the face seal extend completely around the bore.

10. A differential pressure indicator comprising:

means defining a bore having first and second ends;

a piston slidable along a path within the bore;

a biasing member acting on the piston to urge the piston towards the first bore end;

means defining an annular surface extending around the bore in the path of the piston;

a first end surface on the piston and including an annular outer portion urged by the biasing member into engagement with the annular surface of the bore to provide a face seal and an inner portion surrounded by the outer portion and extending beyond the annular surface toward the firs bore end when outer portion is in engagement with the annular surface; and means for applying a higher pressure fluid to the first piston face and a lower pressure fluid to the second piston face, the biasing member maintaining the face seal until a predetermined pressure differential between the higher and lower pressures is reached.

11. An indicator according to claim 10 wherein the face seal extend completely around the bore.

* * * * *